United States Patent [19]

Mitchell et al.

[11] 4,241,396

[45] Dec. 23, 1980

[54] TAGGED POINTER HANDLING APPARATUS

[75] Inventors: Glen R. Mitchell, Pine Island; William G. Kempke, Rochester; Eugene R. Jones, Rochester; Merle E. Houdek, Rochester; James G. Ranweiler, Rochester, all of Minn.

[73] Assignee: International Business Machines Corporation, Armonk, N.Y.

[21] Appl. No.: 953,666

[22] Filed: Oct. 23, 1978

[51] Int. Cl.³ .............................................. G06F 13/00
[52] U.S. Cl. ................................................... 364/200
[58] Field of Search ................ 364/200 MS File, 900, 364/200

[56] References Cited

U.S. PATENT DOCUMENTS

| | | |
|---|---|---|
| 3,328,768 | 6/1967 | Amdahl et al. ....................... 364/200 |
| 3,398,405 | 8/1968 | Carlson et al. ....................... 364/200 |
| 3,405,394 | 10/1968 | Dirac .................................... 364/200 |
| 3,573,736 | 4/1971 | Schlaeppi ............................. 364/200 |
| 3,731,285 | 5/1973 | Bell ....................................... 364/200 |
| 3,920,976 | 11/1975 | Christensen et al. ................. 364/200 |
| 4,104,721 | 8/1978 | Markstein et al. .................... 364/200 |

*Primary Examiner*—Leo H. Boudreau
*Attorney, Agent, or Firm*—Kirkland & Ellis

[57] ABSTRACT

Tagged pointer handling apparatus is provided for implementation in a computer system wherein a tag bit is provided for each word in main storage. This invention provides for the mixing of data and pointers within the same storage space, and provides a capability for checking and verifying the validity of the pointers without affecting the performance or operation of other instructions. Only the tag instructions can set the tag bits ON in main storage; all other instructions store data and set the corresponding tag bits OFF. Thus, if a pointer was modified inadvertently by one of these data handling instructions, the fact that the pointer is untagged is detected and the values in the pointer are treated as invalid when the pointer is used by the Load and Verify Tags instruction.

Instructions to load, store, set, move, extract and insert tags are implemented by the tagged pointer handling apparatus. A Load and Verify Tags instruction checks the validity of the pointer and if valid, loads the pointer into a specified general purpose register. A Store and Set Tags instruction stores the value in a specified general purpose register into main storage and sets the associated tag bits ON. A Move and Set Tags instruction moves a word from one location in main storage to another or the same location in main storage and sets the associated tag bits ON. A Move Characters and Tags instruction moves a word and the associated tag bits from one storage location to another storage location. An Extract Tags instruction fetches each word from an operand in main storage, extracts the tag bits, compresses the tag bits to one tag bit per quadword, and stores the tag bits in main storage as data. An Insert Tags instruction fetches the tag bits stored in main storage as data, expands the tag bits to one tag bit per word, and inserts them on each associated word of an operand in main storage.

16 Claims, 3 Drawing Figures

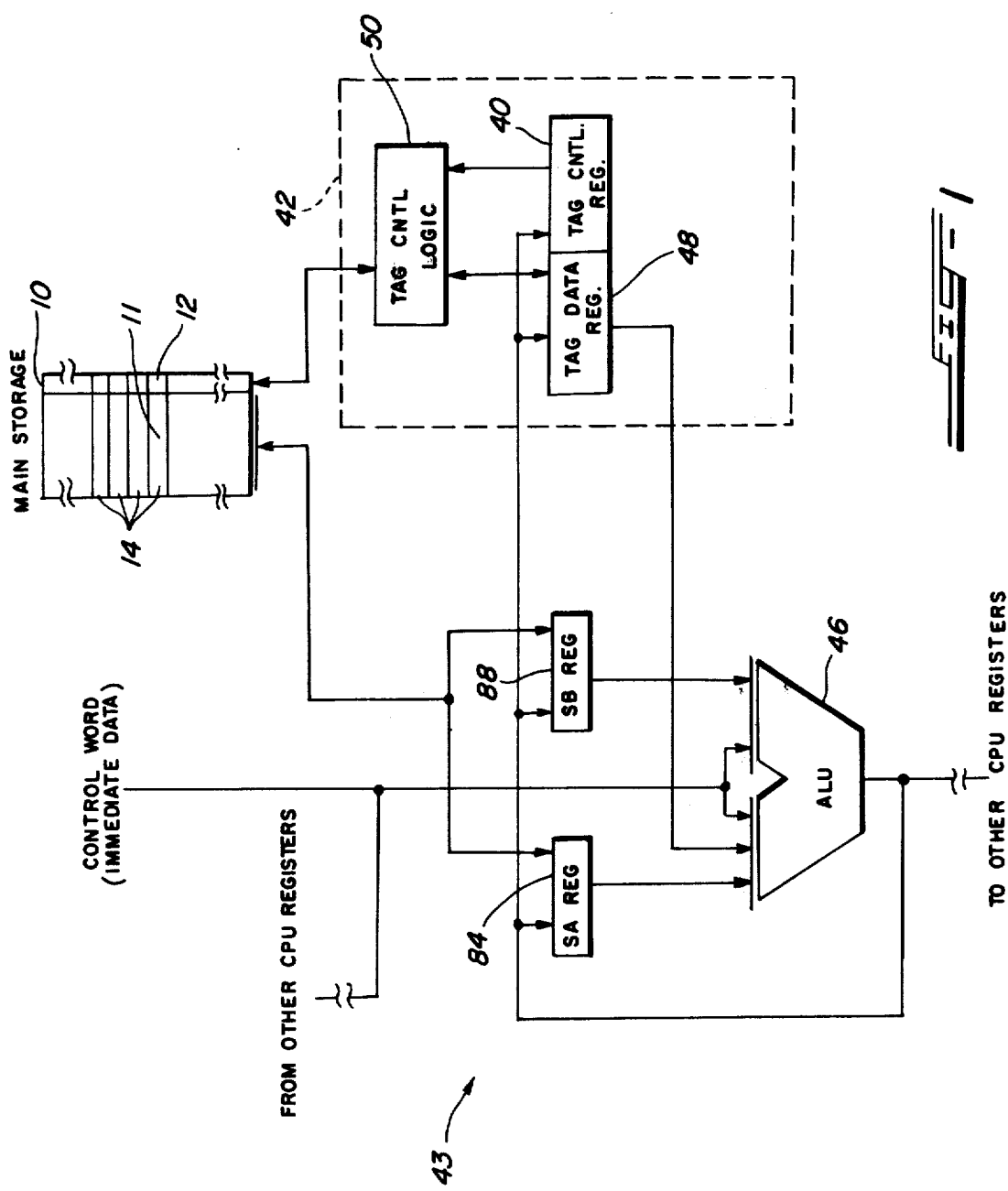

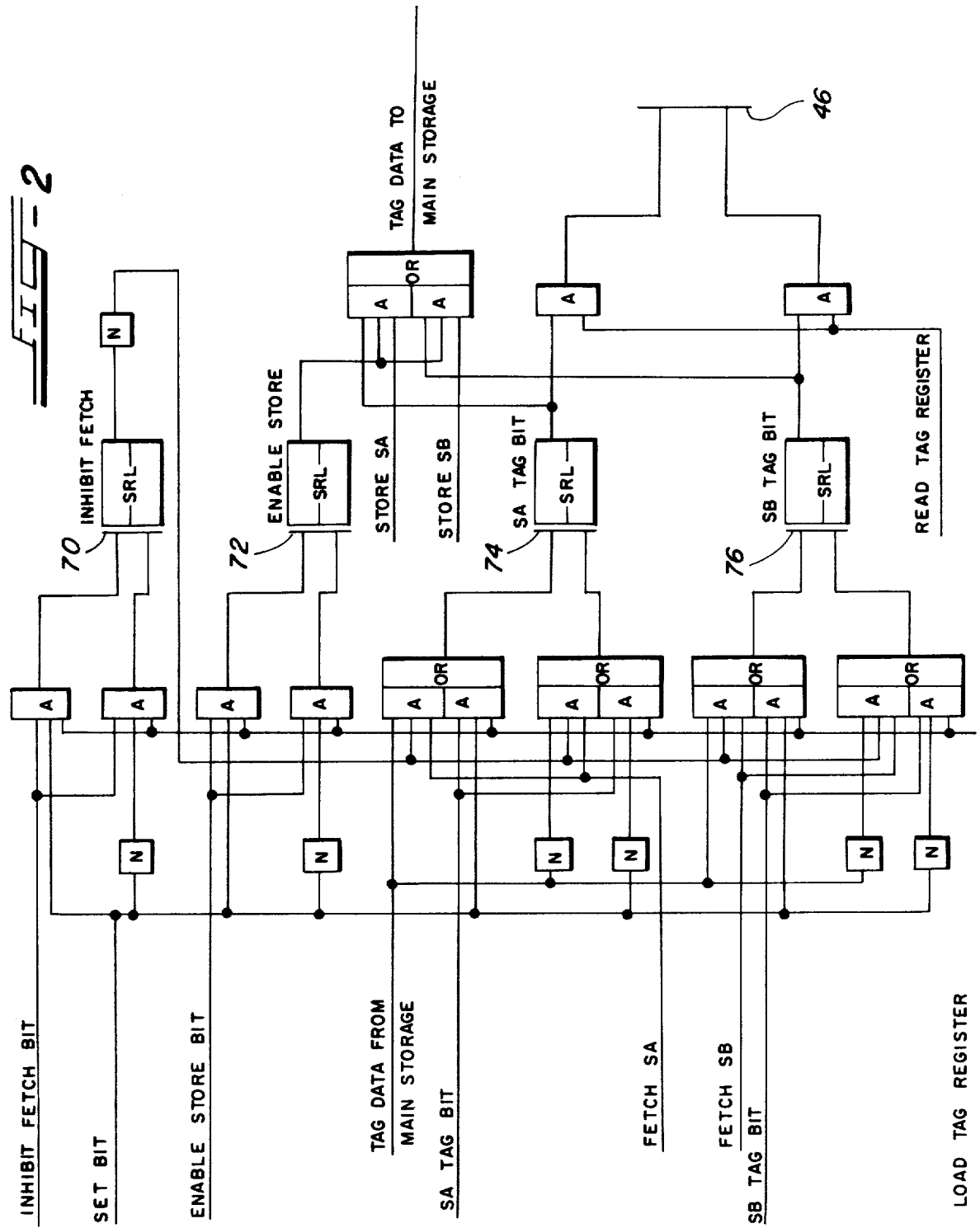

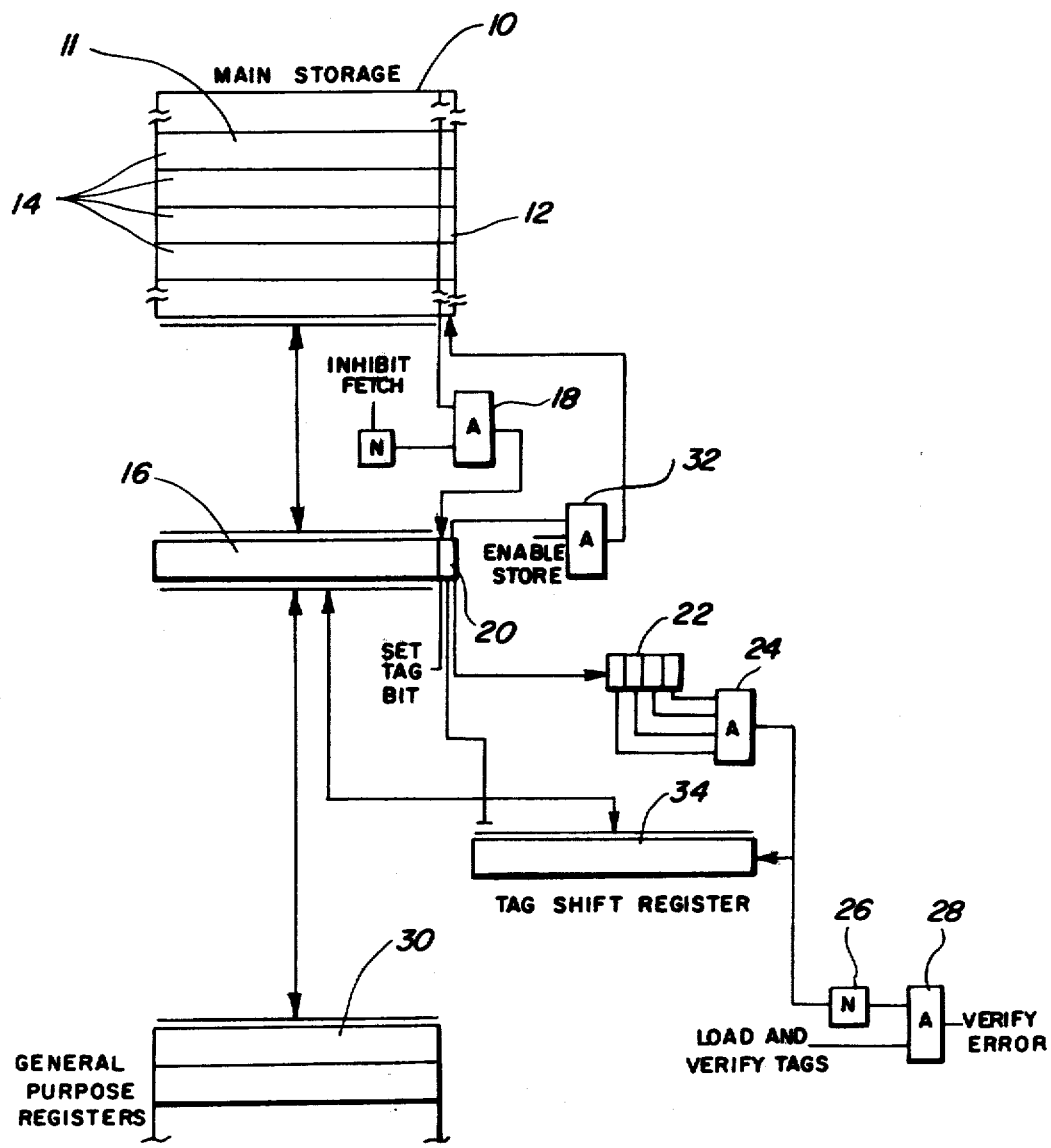

TAGGED POINTER HANDLING APPARATUS

DESCRIPTION

1. Technical Field

This invention relates to tagged pointer handling apparatus for computer systems, and more particularly, to such apparatus where the tagged pointers are mixed with data, and still more particularly, where such apparatus provides the capability for checking the pointers to verify that they are valid and provides the ability to manipulate the tags under instruction control.

The invention finds particular utility in a computer system where the integrity of the data and pointers is important.

2. Background Art

Storage protection in main storage is an important consideration, and various provisions have been made to protect stored information from destruction. The major impetus for storage protection arises in multiprogram sharing of main storage. In such instances, efficient use of main storage does not permit a single fixed area of storage to be protected since storage is generally restructured during the execution of programs.

In the past it has been the practice to allow a supervisory program to control the areas of storage which can be modified by other programs. In one form of storage protection, the supervisory program utilizes a register which specifies the extent of the currently running program. Each program effective address is checked against the extent register; if it is less than the extent, the storage access is permitted; if not, the access is suppressed.

An alternative to the single extent register is to consider the storage to be partitioned into small fixed blocks and to assign a protection tag to each. The tag assignments are held in some storage device changeable only by the supervisory program. Each processor or channel includes a protection-key register, whose contents specify the tag for storage references. The protection key is modifiable only by the supervisory program and will be changed when the processor is switched from one program to another. Each reference to storage is accompanied by a match check of the protection key and the storage tag; if these do not agree, then the access may be suppressed. The tag-key method is more expensive than the extent-register scheme, but it does not restrict the protected storage to one set of contiguous storage locations.

Thus, the use of protection tags allows a program to occupy noncontiguous space in storage and facilitates segmentation and relocation of segments of programs under dynamic storage conditions. The present invention allows each word of main storage to be tagged as opposed to only a block of main storage being tagged or identified. This facilitates the mixing of data and pointers within the same storage space and thus enhances performance. The present invention provides the capability for checking and verifying the validity of the pointers without affecting the performance or operation of other instructions.

DISCLOSURE OF INVENTION

Associated with the execution of a program is an area of storage in which the program can manipulate or store variables. This storage area may be referred to as a space and the variables within the space as pointers and data. A pointer is a quad word (4 words; i.e. 16 bytes) in storage which contains, among other things, a 6-byte address which points to a particular byte or number of bytes within a space. For good performance and usability, particularly with respect to the number of disk accesses required to move the data and pointers to or from main storage, it is desirable to mix data and pointers within the same space. However, since a pointer in one space may be used to access bytes in another space, the capability of checking the integrity or validity of the pointers is required to prevent accidental and unauthorized access to data.

In the present invention, a hardware tag is provided for every word in main storage. The hardware tag is used for the detection of unauthorized changes to pointers. A pointer is considered tagged when all four hardware tag bits of the quad word are ON, and untagged when any of the four hardware tag bits are not ON. Only the tag instructions can set the tag bits ON in main storage; all other instructions store data and set the corresponding tag bits OFF. Thus, if a pointer was modified inadvertently by one of these data handling instructions, then the fact that the pointer is untagged is detected when the pointer is used by the Load and Verify Tags instruction and the values in the pointer are treated as invalid.

The present invention provides apparatus with the capability of checking tagged pointers to verify that the pointers are valid, and further provides tag instructions to load, store, set, move, extract and insert tags. A Load and Verify Tags instruction is used to determine the validity of a tagged pointer and to load a pointer into a specified general purpose register. A Store and Set Tags instruction stores the value in a specified general purpose register into main storage and sets the hardware tags ON for the corresponding quad word. The value in the general purpose register is transferred to main storage via the storage data register which has a tag bit position. A Move and Set Tags instruction moves a quad word from one location in main storage one word at a time through the storage data register to the same or a different location in main storage. The hardware tags are generated via the storage data register when the move occurs. A Move Characters and Tags instruction uses the storage data register to move a word from one storage location to another location. Signals are generated by this instruction for transferring the tag bit through the storage data register and back into storage.

An Extract Tags instruction fetches each word and the corresponding hardware tag bits from an operand in main storage and enters the tag bits into a tag shift-right register. After each word of a quad word has been read the AND of the four tag bits is shifted into the tag shift register. When all quad words have been fetched and all tags have been saved in the tag shift register, the tags are left justified so that the leftmost tag bit in the shift register corresponds to the first quad word of the operand. The contents of the tag shift register are then stored through the storage data register into main storage.

The Insert Tags instruction causes the tag bits stored in main storage to be fetched into the storage data register and transferred to the tag shift register. The leftmost bit of the tag shift register contains the tags for the first quad word of the operand requiring insertion of tag bits. Quad words are fetched word by word and subsequently stored with the corresponding tag bits from the tag shift register.

Thus, it is a principal object of the present invention to provide an apparatus with the capability of checking tagged pointers to verify that the pointers are valid.

It is a further object of this invention to provide apparatus to store, set, move, extract and insert tags in conjunction with corresponding operations on data.

It is a still further object of this invention to provide apparatus to perform these tag operations without affecting the performance or operation of other instructions.

These and other objects, advantages, and features will hereinafter appear, and for purposes of illustration, but not for limitation, exemplary embodiments of the present invention are illustrated in the accompanying drawings.

BRIEF DESCRIPTION OF DRAWINGS

FIG. 1 is a logic diagram showing the interconnection of the tag interface logic with the microprogrammed processor.

FIG. 2 is a logic diagram showing the tag interface logic.

FIG. 3 is a simplified logic diagram for illustrating the tag instructions.

BEST MODE FOR CARRYING OUT THE INVENTION

With reference to the drawings, the invention is illustrated by way of example as being incorporated in a stored program computer system having a main storage 10 divided into addressable areas or words 11 where each addressable area or word 11 contains a hardware tag bit 12. A pointer 14 is a quad word (4 words; i.e. 16 bytes) in storage and is considered tagged when all four hardware tag bits 12 are ON and untagged when any one or more of the four hardware tag bits 12 is OFF.

The instructions to load, store, set, move, extract and insert tags in conjunction with corresponding operations on data are implemented in horizontal microcode. A physical interface is provided to control the transfer of tag bits 12 to and from main storage 10. The interconnection between the tag interface logic 42, main storage 10, and the microcode processor 43 is shown in FIG. 1.

Immediate data from the control word is gated through an arithmetic and logic unit ("ALU") 46 and into tag control register 40 and tag data register 48 simultaneously. By this arrangement, a microcode control word can set any tag control mode into the tag control register 40. If the tag bits 12 are to be set ON for a word 11 in main storage 10, tag data register 48 is set ON.

The tag data register 48 bits can also be set ON by fetching a word 11 with tag bit 12 ON from main storage 10. The tag bits 12 from main storage 10 are gated through the tag control logic 50 under control of the tag control register 40 and inserted in the tag data register 48 when a corresponding fetch command gates data from main storage 10 to SA register 84 and SB register 88. Likewise when storing a word from SA register 84 or SB register 88 into main storage 10, the corresponding tag data register 48 is gated or degated through the tag control logic 50 into tag bit 12 in main storage under the control of the tag control register 40.

The tag data register 48 is also gated to the ALU 46, where tag bits either can be passed on to some other register or can be compared with immediate data from the control word in order to set some external condition code.

FIG. 2 shows the details of the tag interface logic 42. Latches 70, 72 and latches 74, 76 correspond to tag control register 40 and tag data register 48, respectively, shown in FIG. 1. The ALU 46 bus out Inhibit Fetch bit, Enable Store bit, SA tag bit, and SB tag bit select which of latches 70, 72, 74, 76 are to be set or reset. If ALU 46 bus out Set bit is ON, the selected latches 70, 72, 74, 76 will be set ON by the Load Tag Register signal from the control word. If ALU 46 bus out Set bit is OFF the selected latches 70, 72, 74, 76 will be reset by the Load Tag Register signal from the control word. Thus, selected latches 70, 72, 74, 76 may be reset or set while the unselected latches 70, 72, 74, 76 will be unaffected by the Load Tag Register signal from the control word. The SA and SB tag bits from latches 74, 76, respectively, are gated into the ALU 46 bus in lines by the Read Tag Register signal from the control word. Thus, the tag bits are gated to ALU 46 for transfer to other registers or for testing in ALU 46 with immediate data from the control word.

The inhibit fetch latch 70 controls the fetching of tag bits 12 when a word 11 is fetched from main storage 10. When a word 11 is fetched from main storage 10 and gated into SA register 84, the corresponding tag bit 12 is gated into SA tag bit latch 74 by the Fetch SA signal from the control word, provided inhibit fetch latch 70 is OFF. Similarly, when data is fetched from main storage 10 and gated into SB register 88, the corresponding tag bit 12 is gated into SB tag bit latch 76 by the Fetch SB signal from the control word, provided inhibit fetch latch 70 is OFF. If inhibit fetch latch 70 is ON, the tag data bus out from main storage 10 is prevented from setting or resetting SA tag bit latch 74 or SB tag bit latch 76.

If a word in SA register 84 is to be stored in main storage 10, the output of SA tag bit latch 74 is gated into main storage 10 by the Store SA signal from the control word, provided that the enable store latch 72 is ON. Similarly, if a word in SB register 88 is to be stored in main storage 10, the output of SB tag bit latch 76 is gated into main storage 10 by the Store SB signal from the control word, provided the enable store latch 72 is ON. If enable store latch 72 is OFF, the output from SA tag bit latch 74 and SB tag bit latch 76 is not gated to main storage 10 and the stored tag bit 12 is OFF. Thus, the enable store latch 72 controls the storing of tag bits 12 when words 11 are stored in main storage 10 from SA register 84 or SB register 88.

In normal operation both the inhibit fetch latch 70 and enable store latch 72 are set OFF for all instructions except certain tag instructions. Accordingly, no tag bits 12 are ever set ON by these instructions.

The sequence of operation in most instructions is to fetch the operands with a common microcode routine and then branch into the specific microcode for each instruction or instruction type. In the execution of the common microcode routine, the inhibit fetch latch 70 and the enable store latch 72 are both OFF, allowing this logic to read tag bits 12 in case the instruction turns out to be a tag instruction. If it is a tag instruction that does not store tags or is a non-tag instruction, no change is made to the tag control register 40. If the instruction being executed is a tag instruction that ignores fetched tags, but sets tags ON, the microcode through immediate data sets all four latches 70, 72, 74, 76 ON, thus ignoring tag bits 12 fetched from main storage 10 and storing a tag bit 12 in main storage 10 for every word 11 stored in main storage 10. Once the operation has been completed for this instruction, the microcode resets all four latches 70, 72, 74, 76 placing the tag control register 40 in a mode ready for the next instruction.

If the instruction calls for the moving of data words 11 and tags 12 from one location in storage to another, only the enable store latch 72 is set ON, thus allowing any tag bit 12 fetched to be stored in a new location along with the corresponding data word 11. At the end of the operation for this instruction, the microcode resets all four latches 70, 72, 74, 76 in order to be ready for the execution of the next instruction.

The above-described combination of control latches 70, 72, 74, 76 and signals allows the tag control to be set up after the common operand fetch is completed, left ON for the complete operation of that instruction, and then turned OFF to a normal mode at the end of the instruction. This allows the best possible performance to be achieved for these instructions, since the tag control mode is set only once per instruction and then reset only once per instruction.

The ability to set or reset the selected latches 70, 72, 74, 76 without affecting the unselected latches 70, 72, 74, 76 allows other latches not associated with the tag interface to be defined for other purposes and left alone when the tag control register 40 and/or the tag data register 48 is manipulated. This ability to set or reset selected latches is also useful in the situation where the fetch from the common operand fetch routine might not be complete, and the microcode can set the enable store latch 72 without affecting the incompleted fetch operation into SA tag bit latch 74 or SB tag bit latch 76.

The inhibit fetch latch 70 is used in place of an enable fetch latch so that the tag control register 40 can be placed in a fetch and not store mode in one command from the microcode by resetting all four latches 70, 72, 74, 76 at the end of each tag instruction.

The above-described logic is utilized to implement tag instructions to verify, set, move, store, extract and insert tag bits. Only tag instructions can set the tag bits 12 ON in main storage 10. All other instructions store and set the corresponding tag bits 12 OFF. Thus, if a pointer 14 was modified inadvertently by one of these other instructions, the fact that the pointer is untagged is detected, and the values in the pointer are treated as invalid.

Table 1 shows the decode of the tag instructions and the combination of signals from tag control register 40 and tag data register 48 required to perform the desired function. The operational description of each tag instruction is set forth below with specific reference to FIG. 3.

In FIG. 3 the Inhibit Fetch and Enable Store signals are generated by the latches 70 and 72, respectively, shown in FIG. 2. The Set tag bit signal is generated by either SA tag bit latch 74 or SB tag bit latch 76 shown in FIG. 2. The storage data register 16 and tag shift register 34 correspond to either the SA register 84 or SB register 88 shown in FIG. 1. Tag bit 20 of storage data register 16 corresponds to tag data register 48 shown in FIG. 1. The tag shift-right register 22 corresponds to one of the other CPU registers shown in FIG. 1.

TABLE 1

DECODE OF TAG INSTRUCTIONS INTO TAG CONTROL SIGNALS

| INSTRUCTION | INHIBIT FETCH | ENABLE STORE | SET TAG BIT |
|---|---|---|---|
| Load and Verify Tags | NO | NO | NO |
| Store and Set Tags | YES | YES | YES |
| Move and Set Tags | YES | YES | YES |
| Move Characters and Tags | NO | YES | NO |
| Extract Tags | NO | NO | NO |
| Insert Tags | YES | YES | NO |
| Other (Non-tag) | NO | NO | NO |

The Load and Verify Tags instruction references and determines the validity of a pointer 14 in main storage 10. A storage data register 16 is connected to main storage 10 for storing words 11 and tag bits 12 read from, and to be written into, main storage 10. As the words of the pointer 14 are read from main storage 10 into the storage data register 16, the tag bit 12 from main storage 10 is applied to AND circuit 18 which is conditioned by the complement of the Inhibit Fetch signal. The output of AND circuit 18 is applied to the tag bit position 20 of storage data register 16. The tag bit 20 in the storage data register 16 is applied to and stored in tag shift-right register 22. The operation just described then repeats until all four tag bits of the pointer 14 have been stored in tag shift-right register 22.

The outputs of tag shift-right register 22 are applied to AND circuit 24. The output of AND circuit 24 is applied to inverter 26 and its output is applied to AND circuit 28 which is conditioned by the Load and Verify Tags signal. If the four tag bits stored in the tag shift-right register 22 are all ON, no Verify Error signal from AND circuit 28 is detected. However, if any one or more tag bits are OFF, then a Verify Error signal from AND circuit 28 is detected and indicated to the programming system. If no error is detected the address located in the pointer is loaded into the general purpose register 30 specified by the instruction.

The Store and Set Tags instruction stores the value in a specified general purpose register 30 into main storage 10 and sets the tag bits 12 ON for the corresponding quad word 14. A word from general purpose register 30 is transferred to storage data register 16 where the Set tag signal sets the tag bit 20 ON. When the word is transferred from storage data register 16 into main storage 10, the output of tag bit 20 is applied to AND circuit 32 which is conditioned by the Enable Store signal. Thus, when the Enable Store and Set tag bit signals are ON, the tag bits 12 are set when data from the general purpose register 30 is transferred to main storage 10 via the storage data register 16.

The Move and Set Tags instruction moves a quad word 14 from one location in main storage 10 through storage data register 16 one word at a time into a new location or the same location in main storage 10 and sets the tag bits 12 ON. As the words of the pointer are read from main storage 10 into storage data register 16, the Set tag bit signal sets the tag bit 20 ON. When the words are transferred from storage data register 16 back into main storage 10, the output of tag bit 20 is applied to AND circuit 32 which is conditioned by the Enable Store signal. Thus, since both the Enable Store and Set tag bit signals are ON, the tag bits 12 will be set ON during the move operation regardless of the previous state of the tag bits 12 for the quad word 14.

The Move Characters and Tags instructions moves a word 11 and the corresponding tag bit 12 from one location in main storage 10 through storage data register 16 into a new location in main storage 10. As the words 11 of the quad word 14 are read from main storage 10 into storage data register 16, the tag bit 12 is applied to AND circuit 18 which is conditioned by the complement of the Inhibit Fetch signal. The output of AND circuit 18 is applied to the tag bit position 20 of storage data register 16. When the words are transferred from storage data register 16 back into main storage 10, the output of tag bit 20 is applied to AND circuit 32 which is conditioned by the Enable Store signal. Thus, since the Enable Store signal is ON, the corresponding tag bits 12 will be stored in the new location in main storage 10 along with the words 11. The tag bit 12 could be ON or OFF depending on the fetched value.

The extract tags instruction extracts the tag bits 12 from the words 11 for a variable length operand in main storage 10 and stores the tag bits in main storage 10 as data. As the words 11 are read from main storage 10 into storage data register 16, the tag bit 12 from main storage 10 is applied to AND circuit 18 which is conditioned by the complement of the Inhibit Fetch signal. The output of AND circuit 18 is applied to the tag bit position 20 of storage data register 16. The tag bit 20 in the storage data register 16 is applied to and stored in tag shift-right register 22. The operation just described then repeats until all four tag bits have been stored in tag shift-right register 22.

The outputs of tag shift-right register 22 are applied to AND circuit 24, and the output of AND circuit 24 is applied to and stored in tag shift register 34. Thus, as words 11 are read from main storage 10 and stored as data the AND of the tag bits 12 of each quad word 14 are stored in the tag shift register 34. When tag shift register 34 is full its contents are passed through the storage data register 16 and into main storage 10 as data. This operation is repeated until all the words 11 are read. If tag shift register 34 is not full when the last word 11 of the operand is read, tag shift register 34 is left justified before its contents are passed through storage data register 16 and into main storage 10.

The insert tags instruction retrieves the tag bits 12 stored in main storage 10 as data and inserts them in the quad words 14. The tag bits stored as data in main storage 10 are passed through storage data register 16 and into tag shift register 34. The left-most bit of the tag shift register then contains the tag for the first quad word of the page requiring insertion of tag bits.

As the words 11 stored as data are read from main storage 10 into data storage register 16, the leftmost tag bit in tag shift register 34 is read into tag bit 20 of storage data register 16. When the words 11 are transferred from storage data register 16 into main storage 10, the output of tag bit 20 is applied to AND circuit 32 which is conditioned by the Enable Store signal. Thus, since the Enable Store signal is ON the tag bits 12 will be stored along with the word 11. After all tag bits for a given quad word 14 are stored in main storage 10, the tag shift register 34 is shifted one position to the left allowing the next tag bit in tag shift register 34 to be stored along with the next quad word 14 in main storage 10. This procedure is repeated until all words 11 are stored in main storage 10 with the corresponding tag bits 12.

While the preferred embodiment of the invention has been illustrated and described, it is to be understood that the invention is not to be limited to the precise construction herein disclosed, and the right is reserved to all changes and modifications coming within the scope of the invention as defined in the appended claims.

We claim:

1. Tagged pointer handling apparatus for interpreting and manipulating tags in a data processing system comprising:

addressable main storage means divided into addressable areas where each addressable area has a tag bit position;

first register means connected to said main storage means for storing data read from and to be written into said addressable areas including said tag bit position;

second register means for accumulating a number of tag bits as data from a number of said addressable areas are read into said first register means;

tag interpretation means for determining whether any of said number of tag bits accumulated in said second register means are in other than one predetermined state, said tag interpretation means producing an output that is in a first state when all of the tag bits accumulated in said second register means are in one predetermined state and an output that is in a second state when any of the tag bits accumulated in said second register means is not in the one predetermined state;

third register means connected to said tag interpretation means for storing data corresponding to the output from said tag interpretation means, said third register means also being connected to said first register means for storing data read from and to be written into said first register means, whereby the output from said tag interpretation means is stored in said third register means and written into said first register means;

means for generating an error signal when all of said number of tag bits accumulated in said second register means are in other than one predetermined state;

fourth register means connected to said first register means, said fourth register means providing means for storing data read from said first register means, said fourth register means also providing means for storing data to be written into said first register means; and means for setting said tag bits to a predetermined state.

2. The apparatus as set forth in claim 1 wherein said addressable areas are words.

3. Tagged pointer handling apparatus for loading and verifying the validity of the tags in a data processing system comprising:

addressable main storage means divided into addressable areas where each addressable area has a tag bit position;

first register means connected to said main storage means for storing data read from and to be written into said addressable areas including said tag bit position;

second register means for accumulating a number of tag bits as data from a number of said addressable areas are read into said first register means; and signal means for generating an error signal when any of said number of tag bits accumulated in said second register means is not in a predetermined state, whereby an error signal is provided to indicate when a pointer is invalid.

4. Tagged pointer handling apparatus for storing and setting tags in a data processing system comprising:
- addressable main storage means divided into addressable areas where each addressable area has a tag bit position;
- first register means connected to said main storage means for storing data read from and to be written into said addressable areas including said tag bit position;
- second register means connected to said first register means for storing data to be written into said first register means; and
- setting means for setting a tag in said tag bit position to a predetermined state when data is transferred from said second register means to said addressable main storage means via said first register means.

5. Tagged pointer handling apparatus for moving and setting tags in a data processing system comprising:
- addressable main storage means divided into addressable areas where each addressable area has a tag bit position;
- register means connected to said main storage means for storing data read from and to be written into the addressable areas including said tag bit position; and
- setting means for setting the tag bit in said tag bit position to a predetermined state when the corresponding data stored in said register means is written into the addressable area.

6. Tagged pointer handling apparatus for moving data and tags in a data processing system comprising:
- addressable main storage means divided into addressable areas where each addressable area has a tag bit position; and
- register means connected to said main storage means for storing data read from and to be written into said addressable areas including said tag bit position, whereby data and associated tags are moved from one addressable area through said register means into another addressable area within said addressable main storage means.

7. Tagged pointer handling apparatus for extracting tags in a data processing system comprising:
- addressable main storage means divided into addressable areas where each addressable area has a tag bit position;
- first register means connected to said main storage means for storing data read from and to be written into said addressable areas including said tag bit position;
- second register means for accumulating a number of tag bits as data from a number of said addressable areas are read into said first register means;
- tag interpretation means for producing output data corresponding to whether all of said number of tag bits accumulated in said second register means are in one predetermined state; and
- third register means connected to said first register means and said tag interpretation means for storing output data read from said tag interpretation means, said third register means also being connected to said first register means whereby the output data from said tag interpretation means stored in said third register means is passed through said first register means and stored in an addressable area of said addressable main storage means.

8. Tagged pointer handling apparatus for inserting tags in a data processing system comprising:
- addressable main storage means divided into addressable areas where each addressable area has a tag bit position;
- first register means connected to said main storage means for storing data read from and to be written into said addressable areas including said tag bit position; and
- second register means connected to said first register means for storing data read from and to be written into said first register means, whereby tags are read in the form of data from an addressable area of said addressable main storage means, passed through said first register means, stored in said second register means, and the tags stored in said second register means serially passed from said second register means through said first register means into corresponding tag bit positions of addressable storage areas in said addressable main storage means.

9. In a data processing system having an addressable main storage for storing a plurality of words in which pointers having a predetermined number of words are interspersed with words of other data within the main storage, the addressable main storage being divided into addressable areas, each addressable area providing storage for a word and a corresponding tag bit, tag handling apparatus for automatically setting a pointer to the untagged condition, said apparatus comprising:
- first register means for storing data, said first register means having a tag bit position;
- processor means responsive to a predetermined group of instructions for transferring a selected word from main storage to said first register means, said processor means also transferring the tag bit corresponding to the selected word to the tag bit position of said first register means; and
- tag interface logic means for setting to a predetermined state the tag bit in said first register means corresponding to the selected word transferred to said first register means, whereby, if the selected word is one of the words of a pointer, the pointer becomes untagged thereby rendering the pointer invalid.

10. The apparatus as claimed in claim 9 wherein said processor means further comprises:
- means responsive to a predetermined control instruction for transferring data and the corresponding tag from a frist selected addressable area in main storage to a second selected addressable area in main storage, whereby a selected word and its corresponding tag is transferred from a first addressable area in main storage to a second addressable area in main storage.

11. In a data processing system having an addressable main storage for storing a plurality of words in which pointers having a predetermined number of words are interspersed with words of other data within the main storage, the addressable main storage having a tag bit for every word of storage, tag handling apparatus for determining the validity of a pointer, said apparatus comprising:
- first register means for storing data, said first register means having a tag bit position;
- second register means for storing data;
- tag register means for storing a predetermined number of tags, each of the predetermined number of tags corresponding to the word of a pointer;

processor means responsive to a predetermined control instruction for transferring each word of a selected pointer from main storage to said first register means and for transferring each word of the selected pointer from said first register means to said second register means; and tag interface logic means for transferring the tag for each word of the selected pointer from the tag bit position of said first register means to said tag register means as each word and the corresponding tag of the pointer are transferred from main storage to said first register means, the tags for all the words of the selected pointer thereby being accumulated in said tag register means, said tag interface logic means providing an error signal if, after all of the tags for the selected pointer have been accumulated in said tag register means, all tags stored in said tag register means are not in a predetermined state, whereby the validity of the selected pointer is verified by the absence of an error signal.

12. Tagged pointer handling apparatus for storing and setting tags in a data processing system having main storage divided into addressable areas for storing data, each addressable area having a tag bit position for storing a tag corresponding to the data stored in that addressable area, said apparatus comprising:

first register means for storing data, said first register means having a tag bit position;

second register means for storing data;

processor means responsive to a control instruction for transferring data from said second register means to said first register means and for transferring data and a corresponding tag from said first register means to an addressable area of main storage and the corresponding tag bit position, respectively; and tag interface logic means responsive to the control instruction for setting to a predetermined state the tag in the tag bit position of said first register means when data is transferred from said second register means to said first register means, whereby selected data stored in said second register means is transferred to an addressable area in main storage and a tag corresponding to the data is set and stored in the tag bit position for that addressable area.

13. Tagged pointer apparatus for moving data and setting tags in a data processing system having a main storage divided into addressable areas for storing data, including pointers of data in a predetermined number of addressable areas, each addressable area having a tag bit position for storing a tag corresponding to the data stored in that addressable area, said apparatus comprising:

first register means for storing data, said first register means having a tag bit position;

processor means responsive to a control instruction for transferring the data from a selected addressable area to said first register means and for transferring the data, including the corresponding tag in the tag bit position of said first register means, from said first register means to a selected addressable area and the corresponding tag bit position, respectively, in main storage; and tag interface logic means responsive to the control instruction for setting to a first state the tag in the tag bit position of said first register means, whereby data is transferred from main storage to said first register means, the tag for the data is set to a predetermined state, and the data and corresponding tag are stored in the same or a different addressable area in main storage.

14. Tagged pointer apparatus for moving data and tags in a data processing system having main storage divided into addressable areas for storing data, each addressable area having a tag bit position for storing a tag corresponding to the data stored in that addressable area, said apparatus comprising:

first register means for storing data, said first register means having a tag bit position for storing a corresponding tag; and processor means responsive to a control instruction for transferring data and the corresponding tag from a first selected addressable area in main storage to said first register means and for transferring the data and the corresponding tag from said first register means to a second selected addressable area in main storage, whereby data and the corresponding tag are moved from a first selected addressable area in main storage to a second selected addressable area in main storage.

15. Tag apparatus for extracting tags corresponding to words of data in a data processing system having main storage divided into addressable areas for storing words of data, each addressable area having a tag bit position for storing a tag corresponding to the word of data stored in that addressable area, said apparatus comprising:

first register means for storing data, said first register means having a tag bit position for storing a corresponding tag;

tag register means connected to the tag bit position of said first register means for accumulating a predetermined number of tags;

second register means for storing bits of data, said second register means being connected to said tag register means and said first register means;

processor means responsive to a predetermined control instruction for transferring a variable number of words and the corresponding tags from selected addressable areas to said first register means, and for transferring each word and the corresponding tag from said first register means back to a selected addressable area in main storage;

tag interface logic means for transferring the corresponding tag from the tag bit position of said first register means for each of the variable number of words to said tag register means and for determining, after the predetermined number of tags have been accumulated in said tag register means, whether all of the tags accumulated in said tag register means are in a predetermined state, said tag interface logic means having an output that is in a first state when all of the tags accumulated are in the predetermined state and in a second state when all of the tag bits accumulated are not in the predetermined state, said tag interface logic means storing in said second register means a bit corresponding to the output of said tag interface logic means each time the predetermined number of tag bits is accumulated in said tag register means; and means responsive to the control instruction for transferring the contents of said second register means to said first register means and from said first register means to a selected addressable area of main storage, whereby tags corresponding to a variable number of selected words in main storage are extracted and stored in main storage as data, one tag being stored for each predetermined number of words.

16. Tag handling apparatus for inserting tags corresponding to data in a data processing system having main storage divided into addressable areas for storing data, each addressable area having a tag bit position for storing a tag corresponding to the data stored in that addressable area, said apparatus comprising:

first register means for storing data, said first register means having a tag bit position for storing a corresponding tag;

second register means for storing data, each bit in said second register means corresponding to the tag for each of a predetermined number of words;

processor means responsive to a predetermined control instruction for transferring tags stored as data in an addressable area in main storage to said second register means, for transferring selected words from addressable areas in main storage to said first register means, and for transferring words and their corresponding tags from said first register means to addressable areas in main storage;

tag interface logic means for storing in the tag bit position of said first register means a tag corresponding to a selected bit stored in said second register means, said tag interface logic means storing a tag in the tag bit position of said first register means corresponding to the same selected bit stored in said second register means for each of a predetermined number of words stored in said first register means, whereby tags stored as data in main storage are retrieved and stored in said second register means and then inserted as tags for corresponding words retrieved from main storage and stored in said first register means, each word with its corresponding tag inserted being stored again in the main storage.

* * * * *